(12) United States Patent
Fukada (10) Patent No.: US 11,491,997 B2
(45) Date of Patent: Nov. 8, 2022

(54) SENSOR ABNORMALITY DETERMINATION DEVICE FOR FOUR-WHEEL DRIVE VEHICLE

(71) Applicant: TOYOTA JIDOSHA KABUSHIKI KAISHA, Toyota (JP)

(72) Inventor: Shunro Fukada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 17/105,891

(22) Filed: Nov. 27, 2020

(65) Prior Publication Data

US 2021/0163022 A1 Jun. 3, 2021

(30) Foreign Application Priority Data

Nov. 29, 2019 (JP) .............................. JP2019-217588

(51) Int. Cl.
*B60W 50/02* (2012.01)
*B60W 50/029* (2012.01)

(52) U.S. Cl.
CPC ...... *B60W 50/0205* (2013.01); *B60W 50/029* (2013.01); *B60W 2050/021* (2013.01); *B60W 2050/0215* (2013.01); *B60W 2050/0292* (2013.01); *B60W 2300/18* (2013.01)

(58) Field of Classification Search
CPC ............... B60K 17/165; B60K 17/348; B60W 2050/021; B60W 2050/0215; B60W 2050/0292; B60W 2300/18; B60W 50/0205; B60W 50/029
See application file for complete search history.

(56) References Cited

U.S. PATENT DOCUMENTS

| 2003/0226702 A1* | 12/2003 | Imai | B60K 23/0808 |
| | | | 180/197 |
| 2006/0106513 A1* | 5/2006 | Ohba | B60T 8/885 |
| | | | 701/29.2 |
| 2014/0046532 A1* | 2/2014 | Saito | B60W 50/0205 |
| | | | 701/30.4 |
| 2016/0263995 A1 | 9/2016 | Yoshimura et al. | |
| 2019/0195291 A1* | 6/2019 | Eisl | F16D 11/14 |
| 2020/0032863 A1* | 1/2020 | Li | F16D 48/06 |

FOREIGN PATENT DOCUMENTS

JP 2016-168982 A 9/2016

* cited by examiner

*Primary Examiner* — Jeff A Burke
*Assistant Examiner* — Zachary Joseph Wallace
(74) *Attorney, Agent, or Firm* — Oblon, McClelland, Maier & Neustadt, L.L.P.

(57) ABSTRACT

A sensor abnormality determination device of a four-wheel drive vehicle including a drive source, main drive wheels and sub-drive wheels, a power transmitting member, a first connecting/disconnecting device, a second connecting/disconnecting device, a first sensor, and a rotation sensor, the sensor abnormality determination device comprises a first sensor abnormality determining portion determining that the first sensor is abnormal when the rotation sensor detects the rotation of the power transmitting member and it is presumed that the four-wheel drive vehicle is in the four-wheel drive state, when the first sensor detects that the first connecting/disconnecting device is in the disconnecting state, and when the rotation sensor detects the rotation of the power transmitting member after the second connecting/disconnecting device is switched to the disconnecting state.

4 Claims, 4 Drawing Sheets

SENSOR ABNORMALITY DETERMINATION DEVICE FOR FOUR-WHEEL DRIVE VEHICLE

This application claims priority from Japanese Patent Application No. 2019-217588 filed on Nov. 29, 2019, the disclosure of which is herein incorporated by reference in its entirety.

FIELD OF THE INVENTION

The present invention relates to a device determining an abnormality of a sensor detecting an operation position of a connecting/disconnecting device switching a two-wheel drive state and a four-wheel drive state in a four-wheel drive vehicle capable of switching from one of the two-wheel drive state and the four-wheel drive state to the other.

DESCRIPTION OF THE RELATED ART

A proposed four-wheel drive vehicle includes a drive source, main drive wheels and sub-drive wheels, a power transmitting member such as a propeller shaft transmitting a power to the sub-drive wheels, a power distribution mechanism disposed on the power transmitting member to control a ratio of drive power transmitted to the main drive wheels and the sub-drive wheels, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a first sensor detecting a connecting/disconnecting state of the first connecting/disconnecting device, a second sensor detecting a connecting/disconnecting state of a second clutch, and a rotation sensor detecting rotation of the power transmitting member, and at least the first clutch is released when the power from the drive source is not transmitted to the sub-drive wheels, while both the first clutch and the second clutch are engaged when the power is transmitted to the sub-drive wheels. For example, this corresponds to a four-wheel drive vehicle with a disconnect function described in Patent Document 1.

In the four-wheel drive vehicle of Patent Document 1, the first sensor and the second sensor respectively detect the connecting/disconnecting states of the first connecting/disconnecting device and the second connecting/disconnecting device, and therefore, if a difference occurs between a switching operation of the first connecting/disconnecting device and a switching position of the first connecting/disconnecting device detected by the first sensor and if a difference occurs between a switching operation of the second connecting/disconnecting device and a switching position of the second connecting/disconnecting device detected by the second sensor, at the time of switching between the two-wheel drive state and the four-wheel drive state, the outputs of the first and second sensors and the output of the rotation sensor can be used for determining whether an abnormality has occurred in the first sensor or the second sensor or an abnormality has occurred in operation of the first connecting/disconnecting device or the second connecting/disconnecting device in each case.

PRIOR ART DOCUMENT

Patent Document

Patent Document 1: Japanese Laid-Open Patent Publication No. 2016-168982

SUMMARY OF THE INVENTION

Technical Problem

The four-wheel drive vehicle described above has a problem that when one of the first sensor and the second sensor is eliminated, and an output value of the rotation sensor detecting the rotation of the power transmitting member does not match the switching operation states of the first connecting/disconnecting device and the second connecting/disconnecting device in a two-wheel drive (2WD) running state or a four-wheel drive (4WD) running state of the vehicle, a determination cannot be made on whether a sensor abnormality has occurred or an abnormality has occurred in mechanical switching positions of the first connecting/disconnecting device and the second connecting/disconnecting device.

The present invention was conceived in view of the situations and it is therefore an object of the present invention to provide a sensor abnormality determination device for a four-wheel drive vehicle capable of demining whether a sensor abnormality has occurred or an abnormality has occurred in mechanical switching positions of the first connecting/disconnecting device and the second connecting/disconnecting device when one of the first sensor and the second sensor is eliminated and an output value of the rotation sensor detecting the rotation of the power transmitting member does not match the mechanical switching positions of the first connecting/disconnecting device and the second connecting/disconnecting device in the two-wheel drive (2WD) running state or the four-wheel drive (4WD) running state of the vehicle.

Solution to Problem

To achieve the above object, a first aspect of the present invention provides a sensor abnormality determination device of a four-wheel drive vehicle including (a) a drive source, main drive wheels and sub-drive wheels, a power transmitting member transmitting a power to the sub-drive wheels, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a first sensor detecting a connecting/disconnecting state of the first connecting/disconnecting device, and a rotation sensor detecting rotation of the power transmitting member, the four-wheel drive vehicle bringing at least the first connecting/disconnecting device into a disconnecting state to stop the rotation of the power transmitting member in the case of two-wheel drive state in which the power from the drive source is not transmitted to the sub-drive wheels and bringing both the first connecting/disconnecting device and the second connecting/disconnecting device into a connecting state in the case of four-wheel drive state in which the power is transmitted to the sub-drive wheels, the sensor abnormality determination device comprising: (b) a first sensor abnormality determining portion determining that the first sensor is abnormal when the rotation sensor detects the rotation of the power transmitting member and it is presumed that the four-wheel drive vehicle is in the four-wheel drive state, when the first sensor detects that the first connecting/disconnecting device is in the disconnecting state, and when the rotation sensor detects the rotation of the power transmitting member after the second connecting/disconnecting device is switched to the disconnecting state.

A second aspect of the present invention provides a sensor abnormality determination device of a four-wheel drive vehicle including (a) a drive source, main drive wheels and sub-drive wheels, a power transmitting member transmitting a power to the sub-drive wheels, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a second sensor detecting a connecting/disconnecting state of the second connecting/disconnecting device, and a rotation sensor detecting rotation of the power transmitting member, the four-wheel drive vehicle bringing at least the first connecting/disconnecting device into a disconnecting state to stop the rotation of the power transmitting member in the case of two-wheel drive state in which the power from the drive source is not transmitted to the sub-drive wheels and bringing both the first connecting/disconnecting device and the second connecting/disconnecting device into a connecting state in the case of four-wheel drive state in which the power is transmitted to the sub-drive wheels, the sensor abnormality determination device comprising: (b) a second sensor abnormality determining portion determining that the second sensor is abnormal when the rotation sensor detects the rotation of the power transmitting member and it is presumed that the four-wheel drive vehicle is in the four-wheel drive state, when the second sensor detects that the second connecting/disconnecting device is in the disconnecting state, and when the rotation sensor detects the rotation of the power transmitting member after the first connecting/disconnecting device is switched to the disconnecting state.

A third aspect of the present invention provides a sensor abnormality determination device of a four-wheel drive vehicle including (a) a drive source, main drive wheels and sub-drive wheels, a power transmitting member transmitting a power to the sub-drive wheels, a power distribution mechanism disposed on the power transmitting member to control a ratio of drive power transmitted to the main drive wheels and the sub-drive wheels respectively, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a first sensor detecting a connecting/disconnecting state of the first connecting/disconnecting device, and a rotation sensor detecting rotation of the power transmitting member on the downstream side relative to the power distribution mechanism, the four-wheel drive vehicle bringing the power distribution mechanism into a disengaged state and bringing at least the first connecting/disconnecting device into a disconnecting state to stop the rotation of the power transmitting member in the case of two-wheel drive state in which the power from the drive source is not transmitted to the sub-drive wheels, and bringing the power distribution mechanism into an engaged state or a half-engaged state and bringing both the first connecting/disconnecting device and the second connecting/disconnecting device into a connecting state in the case of four-wheel drive state in which the power is transmitted to the sub-drive wheels, the sensor abnormality determination device comprising: (b) a first sensor abnormality determining portion determining that the first sensor is abnormal when the rotation sensor detects that the rotation of the power transmitting member is stopped and it is presumed that the four-wheel drive vehicle is in the two-wheel drive state, when the first sensor detects that the first connecting/disconnecting device is in the connecting state, and when the rotation sensor detects that the rotation of the power transmitting member is stopped after the power distribution mechanism is switched to the engaged state.

A fourth aspect of the present invention provides a sensor abnormality determination device of a four-wheel drive vehicle including (a) a drive source, main drive wheels and sub-drive wheels, a power transmitting member transmitting a power to the sub-drive wheels, a power distribution mechanism disposed on the power transmitting member to control a ratio of drive power transmitted to the main drive wheels and the sub-drive wheels respectively, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a second sensor detecting a connecting/disconnecting state of the second connecting/disconnecting device, and a rotation sensor detecting rotation of the power transmitting member on the upstream side relative to the power distribution mechanism, the four-wheel drive vehicle bringing the power distribution mechanism into a disengaged state and bringing at least the first connecting/disconnecting device into a disconnecting state to stop the rotation of the power transmitting member in the case of two-wheel drive state in which the power from the drive source is not transmitted to the sub-drive wheels, and bringing the power distribution mechanism into an engaged state or a half-engaged state and bringing both the first connecting/disconnecting device and the second connecting/disconnecting device into a connecting state in the case of four-wheel drive state in which the power is transmitted to the sub-drive wheels, the sensor abnormality determination device comprising: (b) a second sensor abnormality determining portion determining that the second sensor is abnormal when the rotation sensor detects that the rotation of the power transmitting member is stopped and it is presumed that the four-wheel drive vehicle is in the two-wheel drive state, when the second sensor detects that the second connecting/disconnecting device is in the connecting state, and when the rotation sensor detects that the rotation of the power transmitting member is stopped after the power distribution mechanism is switched to the engaged state.

Advantageous Effects of Invention

According to the sensor abnormality determination device of the four-wheel drive vehicle in the first aspect of the invention, the first sensor abnormality determining portion determines that the first sensor is abnormal when the rotation sensor detects the rotation of the power transmitting member and it is presumed that the four-wheel drive vehicle is in the four-wheel drive state, when the first sensor detects that the first connecting/disconnecting device is in the disconnecting state, and when the rotation sensor detects the rotation of the power transmitting member after the second connecting/disconnecting device is switched to the disconnecting state. As a result, it becomes clear that this is the abnormality of the first sensor rather than the abnormality of the mechanical switching position of the first connecting/disconnecting device.

According to the sensor abnormality determination device of the four-wheel drive vehicle in the second aspect of the invention, the second sensor abnormality determining portion determines that the second sensor is abnormal when the rotation sensor detects the rotation of the power transmitting member and it is presumed that the four-wheel drive vehicle is in the four-wheel drive state, when the second sensor detects that the second connecting/disconnecting device is in the disconnecting state, and when the rotation sensor detects the rotation of the power transmitting member after the first connecting/disconnecting device is switched to the disconnecting state. As a result, it becomes clear that this is the abnormality of the second sensor rather than the abnormality of the mechanical switching position of the second connecting/disconnecting device.

According to the sensor abnormality determination device of the four-wheel drive vehicle in the third aspect of the invention, the first sensor abnormality determining portion determines that the first sensor is abnormal when the rotation sensor detects that the rotation of the power transmitting member is stopped and it is presumed that the four-wheel drive vehicle is in the two-wheel drive state, when the first sensor detects that the first connecting/disconnecting device is in the connecting state, and when the rotation sensor detects that the rotation of the power transmitting member is stopped after the power distribution mechanism is switched to the engaged state. As a result, it becomes clear that this is the abnormality of the first sensor rather than the abnormality of the mechanical switching position of the first connecting/disconnecting device.

According to the sensor abnormality determination device of the four-wheel drive vehicle in the fourth aspect of the invention, the second sensor abnormality determining portion determines that the second sensor is abnormal when the rotation sensor detects that the rotation of the power transmitting member is stopped and it is presumed that the four-wheel drive vehicle is in the two-wheel drive state, when the second sensor detects that the second connecting/disconnecting device is in the connecting state, and when the rotation sensor detects that the rotation of the power transmitting member is stopped after the power distribution mechanism is switched to the engaged state. As a result, it becomes clear that this is the abnormality of the second sensor rather than the abnormality of the mechanical switching position of the second connecting/disconnecting device.

Preferably, in the first and second aspects of the invention, the power transmitting member is provided with a power distribution mechanism controlling a ratio of drive power transmitted to the main drive wheels and the sub-drive wheels, and the rotation sensor detects the rotation of the power transmitting member on the sub-drive wheel side relative to the power distribution mechanism.

Preferably, the power distribution mechanism is an electronic control coupling that includes a wet multiplate clutch portion in which multiple friction plates are stacked and an electromagnetic clutch generating a pressing force applied to the wet multiplate clutch portion in accordance with a command current and that can control distribution of torque transmitted to the main drive wheels and the sub-drive wheels by electrically adjusting a transmission torque.

Preferably, the main drive wheels and the sub-drive wheels are a pair of main drive wheels and pair of sub-drive wheels, respectively, arranged on the left and right sides of the vehicle; the first axles are a pair of first axles respectively coupled to the pair of main drive wheels; the second axles are a pair of second axles respectively coupled to the pair of sub-drive wheels; the transmission torque from the drive source is transmitted via a first differential gear device to each of the pair of first axles; the transmission torque from the power transmitting member is transmitted via a second differential gear device to each of the pair of second axles; the first axle side of the power transmitting member is provided with a first pinion meshed with a first ring gear disposed on a first sleeve shaft projecting from a first differential case of the first differential gear device; and the second axle side of the power transmitting member is provided with a second pinion meshed with a second ring gear disposed on a second sleeve shaft projecting from a second differential case of the second differential gear device; and the first connecting/disconnecting device is a meshing type clutch connecting/disconnecting the first sleeve shaft and the first ring gear in accordance with a command signal; and the second connecting/disconnecting device is a meshing type clutch connecting/disconnecting the second sleeve shaft and the second ring gear in accordance with a command signal.

MODES FOR CARRYING OUT THE INVENTION

An example of the present invention will now be described in detail with reference to the drawings. In the following example, the figures are simplified or deformed as needed and portions are not necessarily precisely drawn in terms of dimension ratio, shape, etc.

EXAMPLE 1

Figure 1:
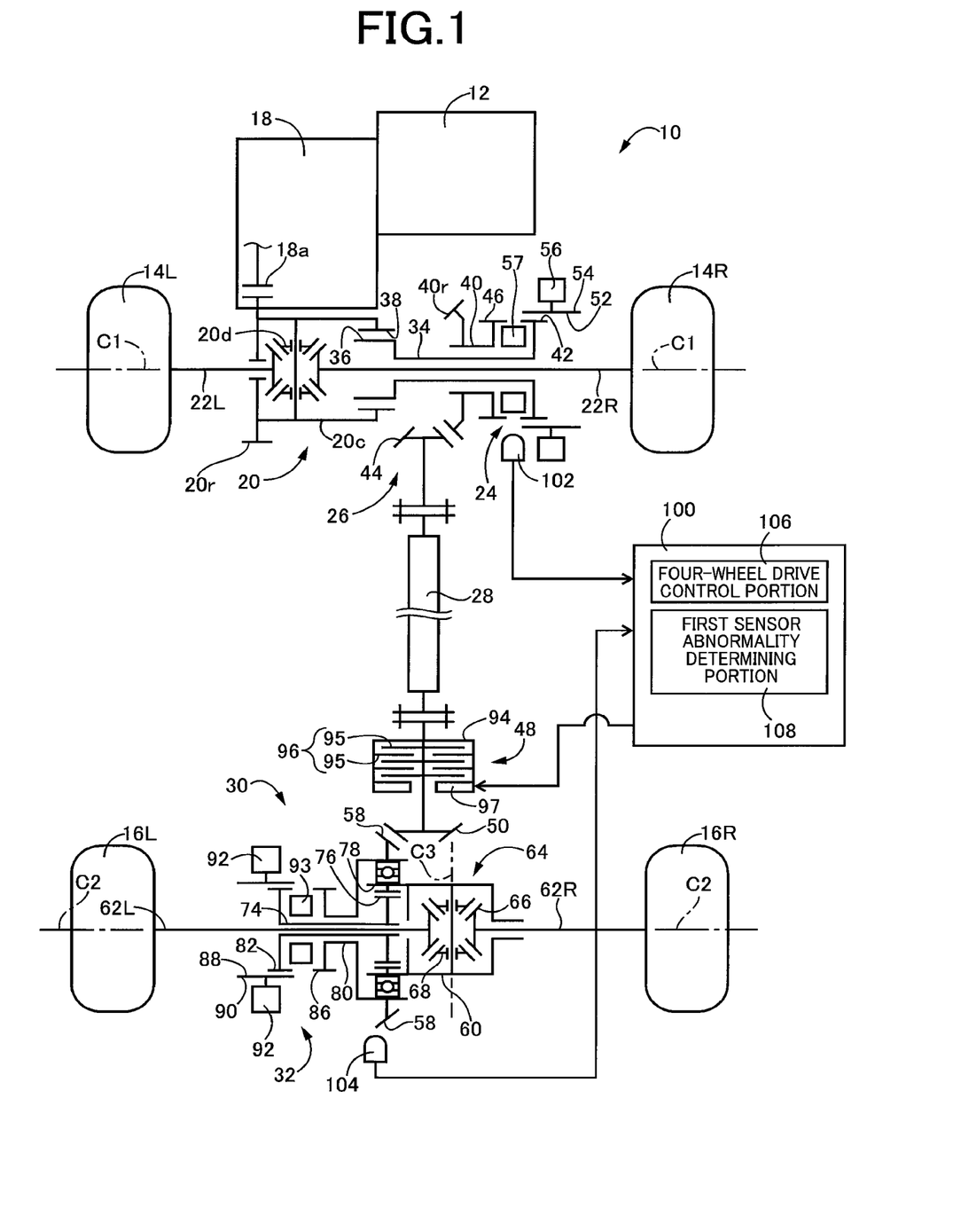
FIG. 1 is a schematic for schematically explaining an example of a configuration of a four-wheel drive vehicle of the present invention and a diagram showing an electronic control device.

FIG. 1 shows a schematic for schematically explaining a configuration of a four-wheel drive vehicle 10 with a disconnect function based on an FF (front-engine/front-drive) system to which the present invention is preferably applied and an electronic control device 100. In FIG. 1, the four-wheel drive vehicle 10 uses an engine 12 as a drive source and has a first power transmission path transmitting a power of the engine 12 to a pair of left and right front wheels 14L, 14R (referred to as front wheels 14 if not particularly distinguished) corresponding to main drive wheels and a second power transmission path transmitting a power of the engine 12 to a pair of left and right rear wheels 16L, 16R (referred to as rear wheels 16 if not particularly distinguished) corresponding to sub-drive wheels.

In the two-wheel drive state of the four-wheel drive vehicle 10, the drive power transmitted from the engine 12 via an automatic transmission 18 is transmitted to the left and right front wheels 14L, 14R through a front-wheel differential unit 20 functioning as a differential gear device and left and right first axles 22L, 22R (referred to as first axles 22 if not particularly distinguished). In this two-wheel drive state, an electronic control coupling 48 is brought into a disengaged state, and at least a first clutch 24 functioning as a first connecting/disconnecting device is released, i.e., disconnected, so that no power is transmitted to a transfer 26, a propeller shaft (power transmitting member) 28, a rear-wheel differential unit 30 functioning as a second differential gear device, left and right second axles 62L, 62R (referred to as second axles 62 if not particularly distinguished), and the rear wheels 16. In this two-wheel drive state, preferably, a second clutch 32 functioning as a second connecting/disconnecting device is also released in addition to the release of the first clutch 24 to stop the rotation of the propeller shaft 28.

However, in the four-wheel drive state, the electronic control coupling 48 is brought into an engaged state or a half-engaged state, and the first clutch 24 and the second clutch 32 are both engaged, so that the drive power from the engine 12 is transmitted to the transfer 26, the propeller shaft 28, the rear-wheel differential unit 30, and the rear wheels 16. Although not shown in FIG. 1, a torque converter or a clutch serving as a fluid transmission device is disposed between the engine 12 and the automatic transmission 18.

For example, the automatic transmission 18 is made up of a multi-speed automatic transmission in a form including multiple planetary gear devices and friction engagement devices (clutches, brakes) and having a gearshift position selected by selectively engaging the friction engagement devices. The automatic transmission 18 may be made up of a multi-speed automatic transmission in a form in which a gearshift position of a constantly-meshed parallel shaft type transmission is selected by a shift actuator and a select actuator. The automatic transmission 18 may be made up of a belt type continuously variable transmission in a form in which a speed change ratio is continuously varied by changing an effective diameter of a pair of variable pulleys having a variable effective diameter with a transmission belt wound therearound, or may be made up of an electric continuously variable transmission controlling a direct torque from the engine by adjusting a reaction force of one of three rotating elements of a differential device with a motor. This automatic transmission 18 is a known technique and therefore will not be described in terms of specific structure and operation.

The front-wheel differential unit 20 has a differential ring gear 20r rotatably disposed around a rotation axis C1 and meshed with an output gear 18a of the automatic transmission 18 and a first differential gear mechanism 20d housed in the first differential case 20c and transmits the drive power via the left and right first axles 22L, 22R to the left and right front wheels 14 while allowing difference rotation thereof. The first differential case 20c is provided with inner-circumferential fitting teeth 38 fitted to outer-circumferential fitting teeth 36 formed on a shaft end of a sleeve shaft 34 of the transfer 26. As a result, a portion of the drive power output from the engine 12 is transmitted via the first differential case 20c of the front-wheel differential unit 20 to the transfer 26, i.e., the sleeve shaft 34 of the transfer 26.

The transfer 26 has the sleeve shaft 34, a large-diameter sleeve shaft 40 provided with a first ring gear 40r for transmitting power to the propeller shaft 28, and the first clutch 24 disposed on a power transmission path between the sleeve shaft 34 and the large-diameter sleeve shaft 40. For example, the first clutch 24 is a meshing type dog clutch (connecting/disconnecting mechanism) selectively connecting/disconnecting the power transmission path between the sleeve shaft 34 and the first ring gear 40r of the large-diameter sleeve shaft 40.

The sleeve shaft 34 is a cylindrical member through which the first axle 22R penetrates on the inner circumferential side thereof and is disposed concentrically and relatively rotatably with respect to the first axle 22R and the large-diameter sleeve shaft 40. The outer-circumferential fitting teeth 36 are formed at one axial end of the sleeve shaft 34, and the outer-circumferential fitting teeth 36 are fitted to inner-circumferential fitting teeth 38 formed in the first differential case 20c so that the sleeve shaft 34 rotates integrally with the first differential case 20c of the front-wheel differential unit 20. Clutch teeth 42 constituting the first clutch 24 are formed at the other axial end of the sleeve shaft 34.

The large-diameter sleeve shaft 40 is a cylindrical member through which the first axle 22R and the sleeve shaft 34 penetrate on the inner circumferential side thereof. The first ring gear 40r meshed with a driven pinion 44 functioning as a first pinion is formed at one axial end portion of the large-diameter sleeve shaft 40. Clutch teeth 46 constituting the first clutch 24 are formed at the other axial end of the large-diameter sleeve shaft 40.

The first ring gear 40r and the driven pinion 44 meshed therewith are bevel gears having helical teeth or hypoid gears formed thereon, for example. The driven pinion 44 is disposed in series at an end portion of the propeller shaft 28 on the front wheel 14 side. An end portion of the propeller shaft 28 on the rear wheel 16 side is provided with a drive pinion 50 functioning as a second pinion via the electronic control coupling 48 that can control a transmission torque with an electric signal from the electronic control device 100 and that functions as a front/rear-wheel drive power distribution device.

The first clutch 24 includes the clutch teeth 42 formed on the sleeve shaft 34, the clutch teeth 46 formed on the large-diameter sleeve shaft 40, and a first movable sleeve 54 provided with inner circumferential teeth 52 constantly meshing with the clutch teeth 42 of the sleeve shaft 34 relatively rotatably in the rotation axis C1 direction and also capable of meshing with the clutch teeth 46 of the large-diameter sleeve shaft 40 due to the movement in the rotation axis C1 direction.

The transfer 26 includes a first actuator 56 moving the first movable sleeve 54 of the first clutch 24 in the rotation axis C1 direction to a meshing position at which the first movable sleeve 54 is meshed with the clutch tooth 46 of the large-diameter sleeve shaft 40 or a non-meshing position at which the first movable sleeve 54 is not meshed with the clutch tooth 46. The transfer 26 preferably includes a synchronizing device 57 reducing a relative rotation difference between the inner circumferential teeth 52 of the first movable sleeve 54 and the clutch teeth 46 before both are meshed in the first clutch 24. FIG. 1 shows a state in which the first clutch 24 is released (a disconnecting state).

The rear-wheel differential unit 30 includes, in the power transmission path from the propeller shaft 28 to the left and right rear wheels 16L, 16R, the second clutch (second connecting/disconnecting device) 32 that is a meshing type second connecting/disconnecting device for selectively connecting/disconnecting a power transmission path between the propeller shaft 28 and the left and right rear wheels 16L, 16R, i.e., between a second ring gear 58 meshed with the drive pinion 50 and a second differential case 60, and a second differential gear device 64 distributing the drive power transmitted from the engine 12 to the second differential case 60 via the second axles 62L, 62R to the left and right rear wheels 16L, 16R while allowing differential rotation when the second clutch 32 is engaged (in a connecting state).

The second differential gear device 64 is coupled to the second differential case 60 rotatably supported around a rotation axis C2, a pair of side gears 66 that are respectively coupled to a pair of the second axles 62L, 62R coupled to the rear wheels 16 and that are rotatably supported around the rotation axis C2 by the second differential case 60 in a state of facing each other in the second differential case 60, and a pair of pinions 68 supported by the second differential case 60 rotatably around a rotation axis C3 orthogonal to the rotation axis C2 and meshed with the pair of the side gears 66 between the side gears 66. The second differential gear device 64 is a known technique and therefore will not be described in terms of specific structure and operation.

In the rear-wheel differential unit 30, the second differential case 60 is provided with inner-circumferential fitting teeth 78 fitted to outer-circumferential fitting teeth 76 formed at a shaft end of a sleeve shaft 74. The second clutch 32 includes the sleeve shaft 74 and a large-diameter sleeve shaft 80 provided with a second ring gear 58 for transmitting power to the second differential case 60. For example, the second clutch 32 is a meshing type dog clutch (connecting/disconnecting mechanism) selectively connecting/disconnecting the power transmission path between the sleeve shaft 74 and the second ring gear 58 of the large-diameter sleeve shaft 80. When the second clutch 32 is brought into an engaged state (connecting state), the drive power transmitted from the propeller shaft 28 is transmitted via the second differential case 60 and the sleeve shaft 74 to a pair of the left and right second axles 62L, 62R.

The sleeve shaft 74 is a cylindrical member through which the second axle 62L penetrates on the inner circumferential side thereof and is disposed concentrically and relatively rotatably with respect to the second axle 62L and the large-diameter sleeve shaft 80. The outer-circumferential fitting teeth 76 are formed at one axial end of the sleeve shaft 74, and the outer-circumferential fitting teeth 76 are fitted to inner-circumferential fitting teeth 78 formed in the second differential case 60 so that the sleeve shaft 74 rotates integrally with the second differential case 60 of the rear-wheel differential unit 30. Clutch teeth 82 constituting the second clutch 32 are formed at the other axial end of the sleeve shaft 74.

The large-diameter sleeve shaft 80 is a cylindrical member through which the second axle 62R and the sleeve shaft 74 penetrate on the inner circumferential side thereof. The second ring gear 58 meshed with a driven pinion 50 functioning as a second pinion is formed at one axial end portion of the large-diameter sleeve shaft 80. Clutch teeth 82 constituting the second clutch 32 are formed at the other axial end of the large-diameter sleeve shaft 40.

The driven pinion 50 is connected to an end portion of the propeller shaft 28 on the rear wheel 16 side. The electronic control coupling 48 capable of controlling a transmission torque with an electric signal from the electronic control device 100 and functioning as a front/rear-wheel drive power distribution device is disposed between the end portion on the front wheel 14 side and the end portion on the rear wheel 14 side of the propeller shaft 28.

The second clutch 32 includes the clutch teeth 82 formed on the sleeve shaft 74, the clutch teeth 86 formed on the large-diameter sleeve shaft 80, and a second movable sleeve 90 provided with inner circumferential teeth 88 constantly meshing with the clutch teeth 82 of the sleeve shaft 74 relatively rotatably in the rotation axis C2 direction and also capable of meshing with the clutch teeth 86 of the large-diameter sleeve shaft 80 due to the movement in the rotation axis C2 direction.

The second clutch 32 includes a second actuator 92 moving the second movable sleeve 90 of the second clutch 32 in the rotation axis C1 direction to a meshing position at which the second movable sleeve 90 is meshed with the clutch tooth 86 of the large-diameter sleeve shaft 80 or a non-meshing position at which the first movable sleeve 54 is not meshed with the clutch tooth 86. The second clutch 32 preferably includes a synchronizing device 93 reducing a relative rotation difference between the inner circumferential teeth 88 of the second movable sleeve 90 and the clutch teeth 86 before both are meshed in the second clutch 32. FIG. 1 shows a state in which the second clutch 32 is released (a disconnecting state).

The electronic control coupling 48 disposed in series at the end portion of the propeller shaft 28 on the front wheel 14 side includes a coupling case 94, a wet multiplate clutch portion 96 in which multiple friction plates 95 alternately coupled to input-side and output-side members are alternately stacked in the coupling case 94, and an electromagnetic actuator portion 97 applying a pressing force to the multiple friction plates 95 in accordance with a command signal from the electronic control device 100.

The electromagnetic actuator portion 97 includes a ball cam, an auxiliary clutch, and an electromagnetic coil, for example, and is configured such that when torque is generated by the electromagnetic actuator portion 97 via the auxiliary clutch, a rotation force transmitted from the rear wheels 16 is converted into a thrust force in a direction parallel to the rotation axis C3, and the ball cam generates a thrust force in the rotation axis C2 direction to engage the friction plates 95.

In FIG. 1, the four-wheel drive vehicle 10 is provided with a first sensor 102 detecting a switching operation state, i.e., the disconnecting state or the connecting state, of the first clutch 24 based on the position of the first movable sleeve 54, for example, and a rotation sensor 104 detecting the rotation of a member on the rear wheel 16 side of the propeller shaft 28 relative to the electronic control coupling 48, for example, the rotation of the second ring gear 58. In this example, the vehicle does not include a second sensor detecting a switching operation state, i.e., the disconnecting state or the connecting state, of the second clutch 32 based on a position of a second movable sleeve 90, for example.

For example, the first sensor 102 includes an electromagnetic pickup detecting the proximity of the first movable sleeve 54, outputs an ON signal when the switching position of the first clutch 24 is in the connecting state, and outputs an OFF signal when the switching position of the first clutch 24 is in the disconnecting state.

The rotation sensor 104 includes an electromagnetic pickup outputting a pulse signal each time a tooth of the second ring gear 58 pass therethrough, or each time a tooth of a pulse rotor having notches formed at equal intervals in the circumferential direction and rotating together with the second ring gear 58 pass therethrough, and detects the rotation of the second ring gear 58, i.e., a rotation state of the propeller shaft 28.

The electronic control device 100 is a microcomputer having a CPU, a RAM, a ROM, and an input/output interface, for example, and the CPU executes signal processes in accordance with a program stored in advance in the ROM, while utilizing a temporary storage function of the RAM, to provide various controls. The electronic control device 100 includes a four-wheel drive control portion 106 providing a control of switching one of a two-wheel drive mode and a four-wheel drive mode of the four-wheel drive vehicle 10 to the other, for example, in accordance with a switching signal from a changeover switch operated by a driver or in accordance with a road surface condition, a disconnect control of stopping the rotation of the propeller shaft 28 by bringing the first clutch 24 and the second clutch 32 into the disconnecting state when the two-wheel drive mode is selected, and a drive power distribution ratio control of controlling a drive power distribution ratio of the front and rear wheels depending on, for example, longitudinal G, when the four-wheel drive mode is selected.

The electronic control device 100 includes a first sensor abnormality determining portion 108 providing a control of determining an abnormality of the first sensor 102 based on a detection output of the first sensor 102, a detection output of the rotation sensor 104, and which of the two-wheel drive mode and the four-wheel drive mode is selected. The electronic control device 100 functions as a sensor abnormality determining device determining an abnormality of the first sensor 102 etc.

In a state where the vehicle is in the four-wheel drive state and the rotation sensor 104 detects the rotation of the propeller shaft 28, i.e., the rotation of the propeller shaft 28 detected by the rotation sensor 104 is not stopped, and where the connecting/disconnecting state of the first clutch 24 detected by the first sensor 102 indicates the disconnecting state, if the rotation of the propeller shaft 28 detected by the rotation sensor 104 does not stop when the second clutch 32 is switched to the disconnecting state, the first sensor abnormality determining portion 108 determines that the first sensor 102 is abnormal.

In a state where the vehicle is in the two-wheel drive state and the rotation of the propeller shaft 28 detected by the rotation sensor 104 is stopped and where the first clutch 24 detected by the first sensor 102 indicates the connecting state, if the rotation of the propeller shaft 28 detected by the rotation sensor 104 indicates top when the electronic control coupling 48 is switched to the engaged state, the first sensor abnormality determining portion 108 determines that the first sensor 102 is abnormal.

Figure 2:
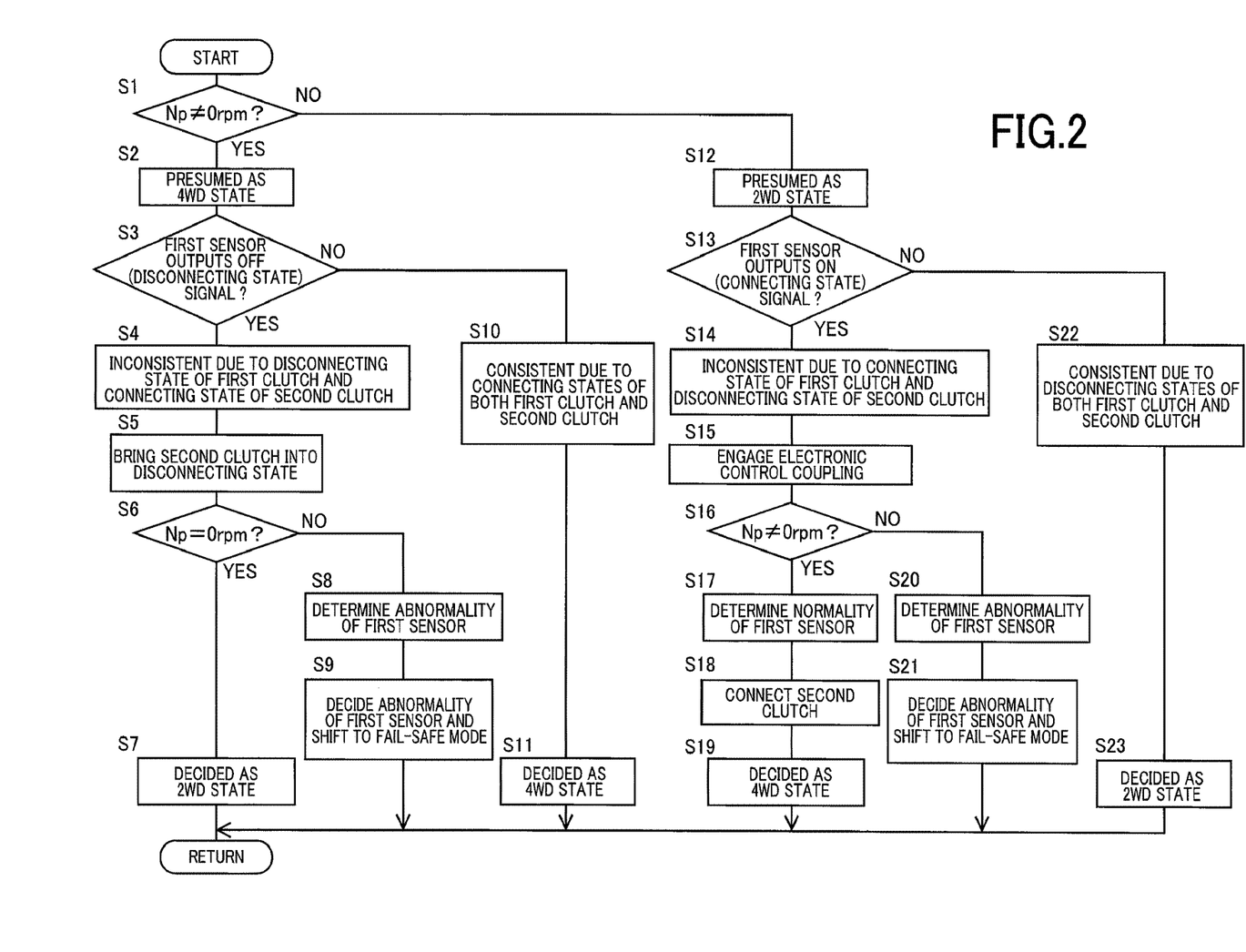
FIG. 2 is a flowchart for explaining a main portion of a sensor abnormality determination operation of the electronic control device of FIG. 1.

FIG. 2 is a flowchart for explaining a main portion of the control operation of the electronic control device 100, i.e., the main part of the first sensor abnormality determination control of the first sensor abnormality determining portion 108, and the flowchart is repeatedly executed for each predetermined control cycle of several ms to several tens of ms, for example. In FIG. 2, at step S1 (hereinafter referred to as S1), it is determined whether a rotation speed Np of the propeller shaft 28 is other than 0 rpm, i.e., whether the propeller shaft 28 is rotating, based on an output signal from the rotation sensor 104. If the determination of S1 is affirmative, it is presumed at S2 that the four-wheel drive vehicle 10 is in the four-wheel drive state in which both the first clutch 24 and the second clutch 32 are in the contacting state (engaged state).

Subsequently, at S3, it is determined whether the first clutch 24 is in the disconnecting state, i.e., the released state, based on the output signal of the first sensor 102. If the determination of S3 is affirmative, it is determined at S4 that a mutually inconsistent state exists between the presumption of the connecting states of the first clutch 24 and the second clutch 32, or at least the connecting state of the second clutch 32, presumed from the four-wheel drive state and the disconnecting state of the first clutch 24 based on the output signal of the first sensor 102. At this stage, it is not necessarily decided that the first sensor 102 is abnormal.

At S5 following S4, the electronic control device 100 outputs a drive signal for bringing the second clutch 32 into the disconnecting state to bring the second clutch 32 into the disconnecting state. Subsequently, At S6, it is determined whether the rotation speed Np of the propeller shaft 28 is 0 rpm, i.e., whether the rotation of the propeller shaft 28 is stopped, based on the output signal from the rotation sensor 104.

If the determination of S6 is affirmative, since the propeller shaft 28 is not rotating when the second clutch 32 is brought into the disconnecting state, it is clear that the first clutch 24 is in the disconnecting state, and therefore, it can be confirmed that the first sensor 102 is normal. Therefore, the two-wheel drive state is decided at S7. Subsequently, the two-wheel drive state is switched to the four-wheel drive state as needed.

If the determination of S6 is negative, the propeller shaft 28 is rotating when the second clutch 32 is brought into the disconnecting state, and therefore, an abnormality of the first sensor 102 is determined at S8, and it is decided at S9 that the first sensor 102 is abnormal. The four-wheel drive vehicle 10 is then shifted to a fail-safe mode in which the vehicle can safely run, for example.

If the determination of S3 is negative, it is determined at S10 that mutual consistency exists between the connecting states of the first clutch 24 and the second clutch 32 presumed from the four-wheel drive state and the connecting state of the first clutch 24 based on the output signal of the first sensor 102. Subsequently, at S11, the four-wheel drive state of the four-wheel drive vehicle 10 is decided.

If the propeller shaft 28 is stopped based on the output signal from the rotation sensor 104 and the determination of S1 is negative, it is presumed at S12 that the four-wheel drive vehicle 10 is in the two-wheel drive state. In this two-wheel drive state, both the first clutch 24 and the second clutch 32 are brought into the disconnecting state, so that the rotation of the propeller shaft 28 is stopped to achieve a disconnected state.

Subsequently, at S13, it is determined whether the first clutch 24 is in the connecting state based on the output signal of the first sensor 102. If the determination of S13 is affirmative, it is determined at S14 that a mutually inconsistent state exists between the presumption of the disconnecting states of the first clutch 24 and the second clutch 32, or at least the disconnecting state of the second clutch 32, presumed from the two-wheel drive state and the connecting state of the first clutch 24 based on the output signal of the first sensor 102. At this stage, it is not necessarily decided that the first sensor 102 is abnormal.

At S15 following S14, the electronic control device 100 outputs a drive signal for bringing the electronic control coupling 48 into the engaged state to switch the electronic control coupling 48 to the engaged state.

Subsequently, at S16, it is determined whether the rotation speed Np of the propeller shaft 28 is other than 0 rpm, i.e., whether the propeller shaft 28 is rotating, based on the output signal from the rotation sensor 104. If the determination of S16 is affirmative, since the propeller shaft 28 is rotating when the electronic control coupling 48 is switched to the engaged state, it is clear that the first clutch 24 is in the connecting state, and therefore, it can be confirmed that the first sensor 102 is normal. Therefore, it is decided at S17 that the first sensor 102 is normal, and the second clutch 32 is brought into the contacting state at S18. As a result, the four-wheel drive state is decided at S19. Subsequently, the four-wheel drive state is switched to the two-wheel drive state as needed.

If the determination of S16 is negative, the propeller shaft 28 is not rotating when the electronic control coupling 48 is switched to the engaged state, and therefore, an abnormality of the first sensor 102 is determined at S20, and it is decided at S21 that the first sensor 102 is abnormal. The four-wheel drive vehicle 10 is then shifted to the fail-safe mode in which the vehicle can safely run, for example.

If the determination of S13 is negative, it is determined at S22 that mutual consistency exists between the disconnecting states of the first clutch 24 and the second clutch 32 presumed from the two-wheel drive state and the disconnecting state of the first clutch 24 based on the output signal of the first sensor 102. Subsequently, at S23, the two-wheel drive state of the four-wheel drive vehicle 10 is decided.

The electronic control device (sensor abnormality determination device) 100 of this example is the electronic control device (sensor abnormality determination device) 100 of a four-wheel drive vehicle including the engine (drive source) 12, the front wheels (main drive wheels) 14 and the rear wheels (sub-drive wheels) 16, the propeller shaft (power transmitting member) 28 transmitting the power to the rear wheels 16, the first clutch (first connecting/disconnecting device) 24 disposed on the first axles 22 coupled to the front wheels 14 to connect and disconnect between the engine 12 and the propeller shaft 28, the second clutch (second connecting/disconnecting device) 32 disposed on the second axles 62 coupled to the rear wheels 16 to connect and disconnect between the propeller shaft 28 and the rear wheel 16, the first sensor 102 detecting a connecting/disconnecting state of the first clutch 24, and the rotation sensor 104 detecting rotation of the propeller shaft 28, the four-wheel drive vehicle bringing at least the first clutch into a disconnecting state to stop the rotation of the propeller shaft 28 in the case of two-wheel drive state in which the power from the engine 12 is not transmitted to the rear wheels 16 and bringing both the first clutch and the second clutch into a connecting state in the case of four-wheel drive state in which the power is transmitted to the rear wheels 16, wherein when the rotation sensor 104 detects the rotation of the propeller shaft 28 (NO of S6) and it is presumed that the four-wheel drive vehicle is in a four-wheel drive state (S2), when the first sensor 102 detects that the first clutch (first connecting/disconnecting device) 24 is in the disconnecting state, and the rotation sensor 104 detects the rotation of the propeller shaft (power transmitting member) 28 after the second clutch (second connecting/disconnecting device) 32 is switched to the disconnecting state, the first sensor abnormality determining portion 108 determines that the first sensor 102 is abnormal (S8, S9). As a result, it becomes clear that this is the abnormality of the first sensor 102 rather than the abnormality of the mechanical switching position of the first clutch 24.

The electronic control device of this example is the electronic control device (sensor abnormality determination device) 100 of a four-wheel drive vehicle including the engine (drive source) 12, the front wheels 14 (main drive wheels) and the rear wheels 16 (sub-drive wheels), the propeller shaft (power transmitting member) 28 transmitting the power to the rear wheels 16, the electronic control coupling (power distribution mechanism) disposed on the propeller shaft 28 to control a ratio of the drive power transmitted to the front wheels 14 and the rear wheels 16, the first clutch (first connecting/disconnecting device) 24 disposed on the first axles 22 coupled to the front wheels 14 to connect and disconnect between the front wheels 14 and the propeller shaft 28, the second clutch (second connecting/disconnecting device) 32 disposed on the second axles 62 coupled to the sub-drive wheels to connect and disconnect between the propeller shaft 28 and the rear wheel 16, the first sensor 102 detecting the connecting/disconnecting state of the first clutch 24, and the rotation sensor 104 detecting rotation of the propeller shaft 28 on the downstream side relative to the electronic control coupling 48, the four-wheel drive vehicle bringing the electronic control coupling 48 into the disengaged state and bringing at least the first clutch 24 into the disconnecting state to stop the rotation of the propeller shaft 28 in the case of two-wheel drive state in which the power from the engine 12 is not transmitted to the rear wheels 16 and bringing the electronic control coupling 48 into the engaged state or the half-engaged state and bringing both the first clutch 24 and the second clutch 32 into the connecting state in the case of four-wheel drive state in which the power is transmitted to the rear wheels 16, wherein when the rotation sensor 104 detects that the rotation of the propeller shaft 28 is stopped (NO of S16) and it is presumed that the four-wheel drive vehicle is in a two-wheel drive state (S12), when the first sensor 102 detects that the first clutch 24 is in the connecting state, and when the rotation sensor 104 detects that the rotation of the propeller shaft (power transmitting member) 28 is stopped after the electronic control coupling 48 is switched to the engaged state, the first sensor abnormality determining portion 108 determines that the first sensor 102 is abnormal (S20, S21). As a result, it becomes clear that this is the abnormality of the first sensor 102 rather than the abnormality of the mechanical switching position of the first clutch 24.

EXAMPLE 2

Another example of the present invention will be described. In the following description, the portions common to the examples are denoted by the same reference numerals and will not be described.

Figure 3:
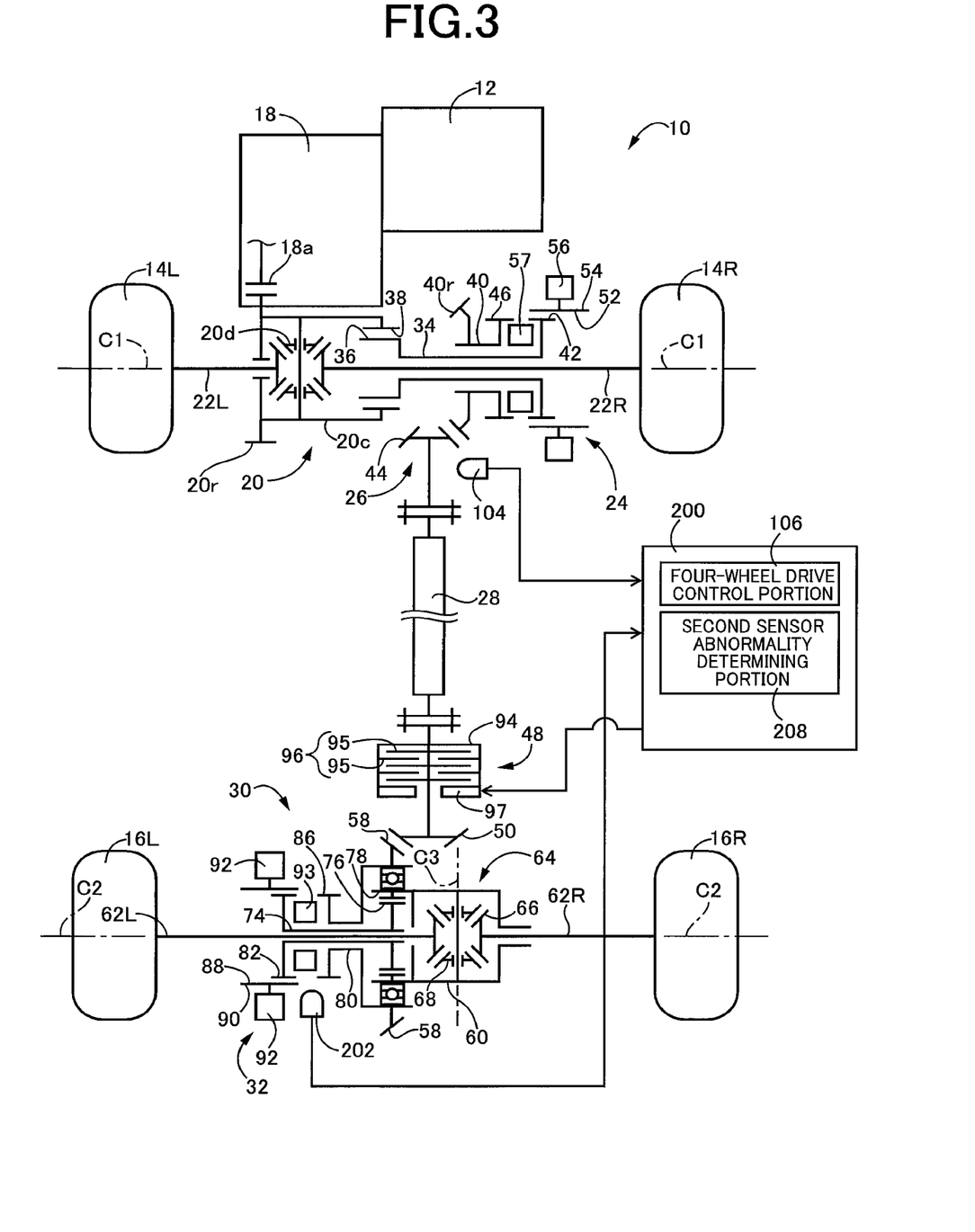
FIG. 3 is a schematic for schematically explaining another example of a configuration of a four-wheel drive vehicle of the present invention and a diagram showing an electronic control device.

FIG. 3 shows a schematic for schematically explaining a configuration of the four-wheel drive vehicle 10 of this example and an electronic control device 200. In FIG. 3, as compared to FIG. 1, differences from the electronic control device 100 are that the rotation sensor 104 is disposed on the propeller shaft 28 at a position of detection of rotation on the upstream side relative to the electronic control coupling 48, that a second sensor 202 detecting the switching operation state, i.e., the disconnecting state or the connecting state, of the second clutch 32 based on, for example, the position of the second movable sleeve 90 is disposed instead of the first sensor 102, and that the electronic control device 200 is provided with a second sensor abnormality determining portion 208 providing a control of determining an abnormality of the second sensor 202 based on a detection output of the second sensor 202, a detection output of the rotation sensor 104, and which of the two-wheel drive mode and the four-wheel drive mode is selected, instead of the first sensor abnormality determining portion 108, and the other configurations are the same. For example, the second sensor 202 includes an electromagnetic pickup detecting the proximity of the second movable sleeve 90, outputs an ON signal when the switching position of the second clutch 32 is in the connecting state, and outputs an OFF signal when the switching position of the second clutch 32 is in the disconnecting state.

Figure 4:
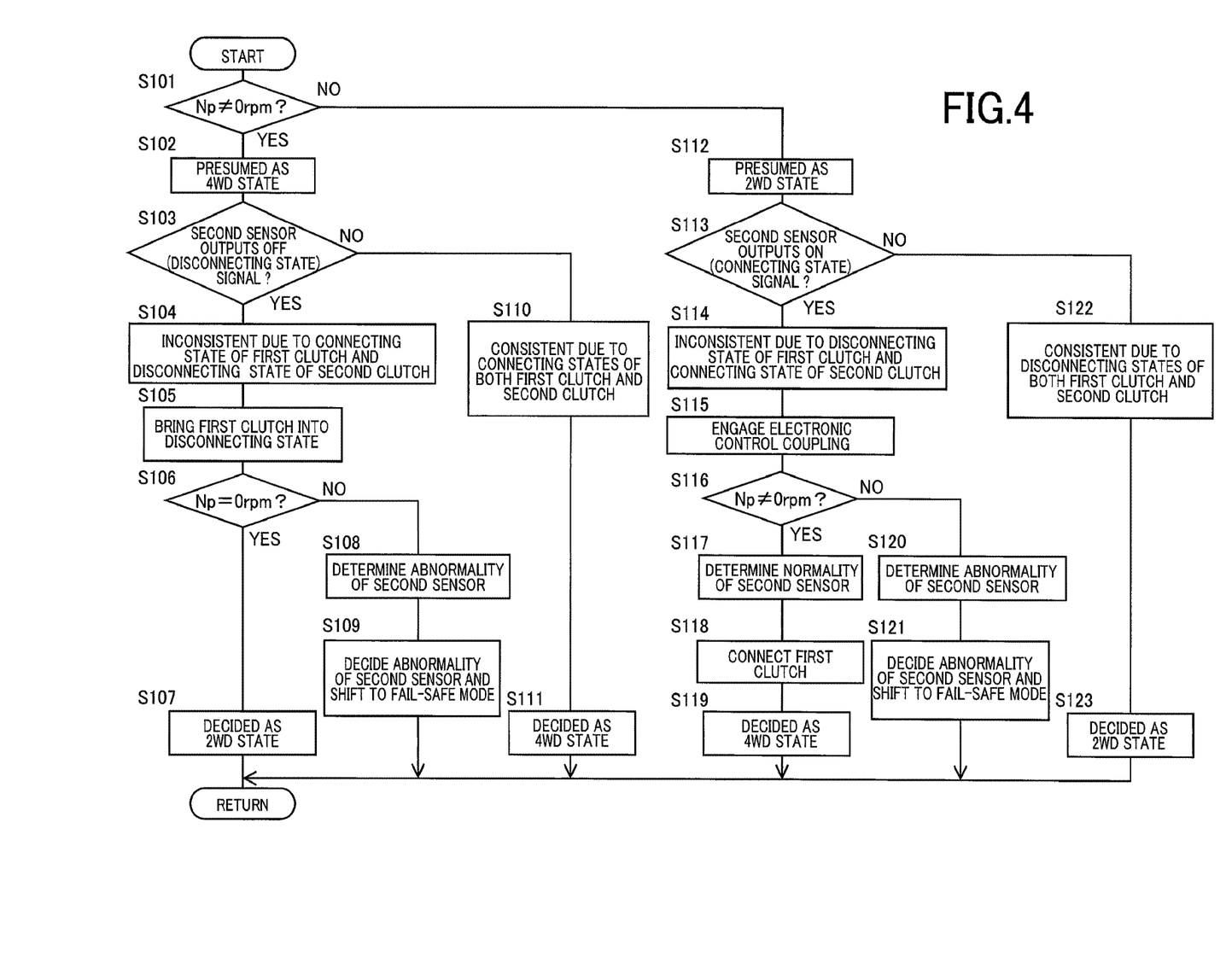
FIG. 4 is a flowchart for explaining a main portion of a sensor abnormality determination operation of the electronic control device of FIG. 3.

FIG. 4 is a flowchart for explaining a main portion of the control operation of the electronic control device 200, i.e., the main part of the second sensor abnormality determination control of the second sensor abnormality determining portion 208, and the flowchart is repeatedly executed for each predetermined control cycle of several ms to several tens of ms, for example. In FIG. 4, at S101, it is determined whether a rotation speed Np of the propeller shaft 28 is other than 0 rpm, i.e., whether the propeller shaft 28 is rotating, based on an output signal from the rotation sensor 104. If the determination of S101 is affirmative, it is presumed at S102 that the four-wheel drive vehicle 10 is in the four-wheel drive state in which both the first clutch 24 and the second clutch 32 are in the contacting state (engaged state).

Subsequently, at S103, it is determined whether the second clutch 32 is in the disconnecting state, i.e., the released state, based on the output signal of the second sensor 202. If the determination of S103 is affirmative, it is determined at S104 that a mutually inconsistent state exists between the presumption of the connecting states of the first clutch 24 and the second clutch 32, or at least the connecting state of the first clutch 24, presumed from the four-wheel drive state and the disconnecting state of the second clutch 32 based on the output signal of the second sensor 202. At this stage, it is not necessarily decided that the second sensor 202 is abnormal.

At S105 following S104, the electronic control device 200 outputs a drive signal for bringing the first clutch 24 into the disconnecting state to bring the first clutch 24 into the disconnecting state.

Subsequently, at S106, it is determined whether the rotation speed Np of the propeller shaft 28 is 0 rpm, i.e., whether the rotation of the propeller shaft 28 is stopped, based on the output signal from the rotation sensor 104. If the determination of S106 is affirmative, since the propeller shaft 28 is not rotating when the first clutch 24 is brought into the disconnecting state, it is clear that the second clutch 32 is in the disconnecting state, and therefore, it can be confirmed that the second sensor 202 is normal. Therefore, the two-wheel drive state is decided at S107. Subsequently, the two-wheel drive state is switched to the four-wheel drive state as needed.

If the determination of S106 is negative, the propeller shaft 28 is rotating when the first clutch 24 is brought into the disconnecting state, and therefore, an abnormality of the first sensor 102 is determined at S108, and it is decided at S109 that the second sensor 202 is abnormal. The four-wheel drive vehicle 10 is then shifted to a fail-safe mode in which the vehicle can safely run, for example.

If the determination of S103 is negative, it is determined at S110 that mutual consistency exists between the connecting states of the first clutch 24 and the second clutch 32 presumed from the four-wheel drive state and the connecting state of the second clutch 32 based on the output signal of the second sensor 202. Subsequently, at S111, the four-wheel drive state of the four-wheel drive vehicle 10 is decided.

If the propeller shaft 28 is stopped and is not rotating based on the output signal from the rotation sensor 104 and the determination of S101 is negative, it is presumed at S112 that the four-wheel drive vehicle 10 is in the two-wheel drive state. Subsequently, at S113, it is determined whether the second clutch 32 is in the connecting state based on the output signal of the second sensor 202.

If the determination of S113 is affirmative, it is determined at S114 that a mutually inconsistent state exists between the presumption of the disconnecting states of the first clutch 24 and the second clutch 32, or at least the disconnecting state of the first clutch 24, presumed from the two-wheel drive state and the connecting state of the second clutch 32 based on the output signal of the second sensor 202. At this stage, it is not necessarily decided that the second sensor 202 is abnormal.

At S115 following S114, the electronic control device 200 outputs a drive signal for bringing the electronic control coupling 48 into the engaged state to switch the electronic control coupling 48 to the engaged state.

Subsequently, at S116, it is determined whether the rotation speed Np of the propeller shaft 28 is other than 0 rpm, i.e., whether the propeller shaft 28 is rotating, based on the output signal from the rotation sensor 104. If the determination of S116 is affirmative, since the propeller shaft 28 is rotating when the electronic control coupling 48 is switched to the engaged state, it is clear that the second clutch 32 is in the connecting state, and therefore, it can be confirmed that the second sensor 202 is normal. Therefore, it is decided at S117 that the second sensor 202 is normal, and the first clutch 24 is brought into the contacting state at S118. As a result, the four-wheel drive state is decided at S119. Subsequently, the four-wheel drive state is switched to the two-wheel drive state as needed.

If the determination of S116 is negative, the propeller shaft 28 is not rotating when the electronic control coupling 48 is switched to the engaged state, and therefore, an abnormality of the second sensor 202 is determined at S120, and it is decided at S121 that the second sensor 202 is abnormal. The four-wheel drive vehicle 10 is then shifted to the fail-safe mode in which the vehicle can safely run, for example.

If the determination of S113 is negative, it is determined at S122 that mutual consistency exists between the disconnecting states of the first clutch 24 and the second clutch 32 presumed from the two-wheel drive state and the disconnecting state of the second clutch 32 based on the output signal of the second sensor 202. Subsequently, at S123, the two-wheel drive state of the four-wheel drive vehicle 10 is decided.

The electronic control device (sensor abnormality determination device) 200 of this example is the electronic control device (sensor abnormality determination device) 200 of a four-wheel drive vehicle including the engine (drive source) 12, the front wheels (main drive wheels) 14 and the rear wheels (sub-drive wheels) 16, the propeller shaft (power transmitting member) 28 transmitting the power to the rear wheels 16, the first clutch (first connecting/disconnecting device) 24 disposed on the first axles 22 coupled to the front wheels 14 to connect and disconnect between the engine 12 and the propeller shaft 28, the second clutch (second connecting/disconnecting device) 32 disposed on the second axles 62 coupled to the rear wheels 16 to connect and disconnect between the propeller shaft 28 and the rear wheel 16, the second sensor 202 detecting a connecting/disconnecting state of the second clutch, and the rotation sensor 104 detecting rotation of the propeller shaft 28, the four-wheel drive vehicle bringing at least the first clutch into a disconnecting state to stop the rotation of the propeller shaft 28 in the case of two-wheel drive state in which the power from the engine 12 is not transmitted to the rear wheels 16 and bringing both the first clutch and the second clutch into a connecting state in the case of four-wheel drive state in which the power is transmitted to the rear wheels 16, wherein when the rotation sensor 104 detects the rotation of the propeller shaft 28 (NO of S106) and it is presumed that the four-wheel drive vehicle is in a four-wheel drive state (S102), when the second sensor 202 detects that the second clutch 32 is in the disconnecting state, and when the rotation sensor 104 detects the rotation of the propeller shaft (power transmitting member) 28 after the first clutch 24 is switched to the disconnecting state, the second sensor abnormality determining portion 208 determines that the second sensor 202 is abnormal. As a result, it becomes clear that this is the abnormality of the second sensor 202 rather than the abnormality of the mechanical switching position of the second clutch 32.

The electronic control device (sensor abnormality determination device) 200 of this example is the electronic control device (sensor abnormality determination device) 200 of a four-wheel drive vehicle including the engine (drive source) 12, the front wheels 14 (main drive wheels) and the rear wheels 16 (sub-drive wheels), the propeller shaft (power transmitting member) 28 transmitting the power to the rear wheels 16, the electronic control coupling (power distribution mechanism) disposed on the propeller shaft 28 to control a ratio of the drive power transmitted to the front wheels 14 and the rear wheels 16, the first clutch (first connecting/disconnecting device) 24 disposed on the first axles 22 coupled to the front wheels 14 to connect and disconnect between the front wheels 14 and the propeller shaft 28, the second clutch (second connecting/disconnecting device) 32 disposed on the second axles 62 coupled to the sub-drive wheels to connect and disconnect between the propeller shaft 28 and the rear wheel 16, the second sensor 202 detecting the connecting/disconnecting state of the second clutch 32, and the rotation sensor 104 detecting rotation of the propeller shaft 28 on the upstream side relative to the electronic control coupling 48, the four-wheel drive vehicle bringing the electronic control coupling 48 into the disengaged state and bringing at least the first clutch 24 into the disconnecting state to stop the rotation of the propeller shaft 28 in the case of two-wheel drive state in which the power from the engine 12 is not transmitted to the rear wheels 16 and bringing the electronic control coupling 48 into the engaged state or the half-engaged state and bringing both the first clutch 24 and the second clutch 32 into the connecting state in the case of four-wheel drive state in which the power is transmitted to the rear wheels 16, wherein when the rotation sensor 104 detects that the rotation of the propeller shaft 28 is stopped and it is presumed that the four-wheel drive vehicle is in a two-wheel drive state (S112), when the second sensor 202 detects that the second clutch 32 is in the connecting state, and when the rotation sensor 104 detects that the rotation of the propeller shaft (power transmitting member) 28 is stopped after the electronic control coupling (power distribution mechanism) 48 is switched to the engaged state, the second sensor abnormality determining portion 208 determines that the second sensor 202 is abnormal. As a result, it becomes clear that this is the abnormality of the second sensor 202 rather than the abnormality of the mechanical switching position of the second clutch 32.

Although the examples of the present invention have been described in detail with reference to the drawings, the present invention is also applied in other forms.

For example, although the first clutch 24 and the second clutch 32 corresponding to the first connecting/disconnecting device and the second connecting/disconnecting device, respectively, of the four-wheel drive vehicle 10 of the examples described above are the meshing type clutches, the clutches may be connecting/disconnecting devices of other types such as friction type clutches.

Although the four-wheel drive vehicle 10 of the examples described above is a vehicle based on the FF system in which the drive power is always transmitted to the front wheels 14 and the drive power is transmitted to the rear wheels 16 only when needed, conversely, the vehicle may be a four-wheel drive vehicle based on an RR (rear-engine/rear-drive) system in which the drive power is always transmitted to the rear wheels 16 and the drive power is transmitted to the front wheels 14 only when needed.

Although the first clutch 24 or the second clutch 32 of the examples described above may include a ball cam and a ratchet mechanism operating a piston with a stroke larger than an operating stroke of a movable piece attracted by an electromagnetic coil. In the ratchet mechanism, the number of steps of receiving teeth of the piston and the number of steps of locking teeth of a holder are not limited to one and may be two or more, for example.

The above description is merely an embodiment and the present invention can be implemented in variously modified and improved forms based on the knowledge of those skilled in the art.

REFERENCE SINGS LIST

10: four-wheel drive vehicle
12: engine (drive source)
14: front wheels (main drive wheels)
16: rear wheels (sub-drive wheels)
22: first axles
24: first clutch (first connecting/disconnecting device)
28: propeller shaft (power transmitting member)
32: second clutch (second connecting/disconnecting device)
48: electronic control coupling (power distribution mechanism)
62: second axles
102: first sensor
100, 200: electronic control device (sensor abnormality determining device)
104: rotation sensor
108: first sensor abnormality determining portion
202: second sensor
208: second sensor abnormality determining portion

What is claimed is:

1. A sensor abnormality determination device of a four-wheel drive vehicle including a drive source, main drive wheels and sub-drive wheels, a power transmitting member transmitting a power to the sub-drive wheels, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a first sensor detecting a connecting/disconnecting state of the first connecting/disconnecting device, and a rotation sensor detecting rotation of the power transmitting member, the four-wheel drive vehicle bringing at least the first connecting/disconnecting device into a disconnecting state to stop the rotation of the power transmitting member in the case of two-wheel drive state in which the power from the drive source is not transmitted to the sub-drive wheels and bringing both the first connecting/disconnecting device and the second connecting/disconnecting device into a connecting state in the case of four-wheel drive state in which the power is transmitted to the sub-drive wheels, the sensor abnormality determination device comprising:
  a first sensor abnormality determining portion determining that the first sensor is abnormal when the rotation sensor detects the rotation of the power transmitting member and it is presumed that the four-wheel drive vehicle is in the four-wheel drive state, when the first sensor detects that the first connecting/disconnecting device is in the disconnecting state, and when the rotation sensor detects the rotation of the power transmitting member after the second connecting/disconnecting device is switched to the disconnecting state.

2. A sensor abnormality determination device of a four-wheel drive vehicle including a drive source, main drive wheels and sub-drive wheels, a power transmitting member transmitting a power to the sub-drive wheels, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a second sensor detecting a connecting/disconnecting state of the second connecting/disconnecting device, and a rotation sensor detecting rotation of the power transmitting member, the four-wheel drive vehicle bringing at least the first connecting/disconnecting device into a disconnecting state to stop the rotation of the power transmitting member in the case of two-wheel drive state in which the power from the drive source is not transmitted to the sub-drive wheels and bringing both the first connecting/disconnecting device and the second connecting/disconnecting device into a connecting state in the case of four-wheel drive state in which the power is transmitted to the sub-drive wheels, the sensor abnormality determination device comprising:
  a second sensor abnormality determining portion determining that the second sensor is abnormal when the rotation sensor detects the rotation of the power transmitting member and it is presumed that the four-wheel drive vehicle is in the four-wheel drive state, when the second sensor detects that the second connecting/disconnecting device is in the disconnecting state, and when the rotation sensor detects the rotation of the power transmitting member after the first connecting/disconnecting device is switched to the disconnecting state.

3. A sensor abnormality determination device of a four-wheel drive vehicle including a drive source, main drive wheels and sub-drive wheels, a power transmitting member transmitting a power to the sub-drive wheels, a power distribution mechanism disposed on the power transmitting member to control a ratio of drive power transmitted to the main drive wheels and the sub-drive wheels respectively, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a first sensor detecting a connecting/disconnecting state of the first connecting/disconnecting device, and a rotation sensor detecting rotation of the power transmitting member on the downstream side relative to the power distribution mechanism, the four-wheel drive vehicle bringing the power distribution mechanism into a disengaged state and bringing at least the first connecting/disconnecting device into a disconnecting state to stop the rotation of the power transmitting member in the case of two-wheel drive state in which the power from the drive source is not transmitted to the sub-drive wheels, and bringing the power distribution mechanism into an engaged state or a half-engaged state and bringing both the first connecting/disconnecting device and the second connecting/disconnecting device into a connecting state in the case of four-wheel drive state in which the power is transmitted to the sub-drive wheels, the sensor abnormality determination device comprising:
  a first sensor abnormality determining portion determining that the first sensor is abnormal when the rotation sensor detects that the rotation of the power transmitting member is stopped and it is presumed that the four-wheel drive vehicle is in the two-wheel drive state, when the first sensor detects that the first connecting/disconnecting device is in the connecting state, and when the rotation sensor detects that the rotation of the power transmitting member is stopped after the power distribution mechanism is switched to the engaged state.

4. A sensor abnormality determination device of a four-wheel drive vehicle including a drive source, main drive wheels and sub-drive wheels, a power transmitting member transmitting a power to the sub-drive wheels, a power distribution mechanism disposed on the power transmitting member to control a ratio of drive power transmitted to the main drive wheels and the sub-drive wheels respectively, a first connecting/disconnecting device disposed on first axles coupled to the main drive wheels to connect and disconnect between the drive source and the power transmitting member, a second connecting/disconnecting device disposed on second axles coupled to the sub-drive wheels to connect and disconnect between the power transmitting member and the sub-drive wheels, a second sensor detecting a connecting/disconnecting state of the second connecting/disconnecting device, and a rotation sensor detecting rotation of the power transmitting member on the upstream side relative to the power distribution mechanism, the four-wheel drive vehicle bringing the power distribution mechanism into a disengaged state and bringing at least the first connecting/disconnecting device into a disconnecting state to stop the rotation of the power transmitting member in the case of two-wheel drive state in which the power from the drive source is not transmitted to the sub-drive wheels, and bringing the power distribution mechanism into an engaged state or a half-engaged state and bringing both the first connecting/disconnecting device and the second connecting/disconnecting device into a connecting state in the case of four-wheel drive state in which the power is transmitted to the sub-drive wheels, the sensor abnormality determination device comprising:
  a second sensor abnormality determining portion determining that the second sensor is abnormal when the rotation sensor detects that the rotation of the power transmitting member is stopped and it is presumed that the four-wheel drive vehicle is in the two-wheel drive state, when the second sensor detects that the second connecting/disconnecting device is in the connecting state, and when the rotation sensor detects that the rotation of the power transmitting member is stopped after the power distribution mechanism is switched to the engaged state.

* * * * *